United States Patent
Shimizu

(10) Patent No.: US 8,818,685 B2
(45) Date of Patent: Aug. 26, 2014

(54) ROTATION DETECTING DEVICE AND ROTATION DETECTING METHOD

(75) Inventor: Hirokazu Shimizu, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 157 days.

(21) Appl. No.: 12/725,154

(22) Filed: Mar. 16, 2010

(65) Prior Publication Data

US 2010/0241302 A1 Sep. 23, 2010

(30) Foreign Application Priority Data

Mar. 18, 2009 (JP) .................................. 2009-066483
Dec. 24, 2009 (JP) .................................. 2009-292797

(51) Int. Cl.
*G06F 19/00* (2011.01)
*F02D 41/00* (2006.01)
*G01P 13/04* (2006.01)
*F01L 13/00* (2006.01)
*F01L 1/344* (2006.01)

(52) U.S. Cl.
CPC .......... *F01L 1/34403* (2013.01); *F02D 41/009* (2013.01); *F02D 2250/06* (2013.01); *G01P 13/045* (2013.01); *F01L 13/0026* (2013.01)
USPC ............. 701/101; 701/71; 701/102; 701/105; 701/113; 123/90.15; 123/90.17; 123/352; 123/406.62; 324/165; 324/166; 324/174

(58) Field of Classification Search
CPC . F02D 41/009; F02D 2250/06; F02D 41/062; F02D 13/0207; F02D 13/0234; F02D 41/222; F01L 2800/00; F01L 2820/032; F01L 13/0026; F01L 1/022; F02N 11/0814; F02N 11/0848; F02N 11/0866
USPC ............. 701/29, 102, 105, 113, 101, 112, 71; 123/90.15, 90.17, 631, 350, 352; 123/406.6, 406.62; 324/174, 165, 166
See application file for complete search history.

(56) References Cited

U.S. PATENT DOCUMENTS 5,794,592 A * 8/1998 Fukui ....................... 123/406.62
6,612,296 B1 * 9/2003 Yonezawa et al. ............. 123/612

(Continued)

FOREIGN PATENT DOCUMENTS

JP 62-182463 A 8/1987
JP 2001-165951 A 6/2001

(Continued)

OTHER PUBLICATIONS

Japanese Office Action dated Aug. 30, 2011 with partial English Translation (three (3) pages).

(Continued)

*Primary Examiner* — John R Olszewski
*Assistant Examiner* — Truc M Do
(74) *Attorney, Agent, or Firm* — Crowell & Moring LLP

(57) ABSTRACT

A rotation detecting device and a rotation detecting method determines normal rotation/reverse rotation of a rotating shaft based on a rotation signal different between the normal rotation and the reverse rotation of the rotating shaft. The rotation signal is set to have a pulse width different between the normal rotation and the reverse rotation of a crankshaft that is an output shaft of an internal combustion engine. By determining whether or not the pulse width is greater than a threshold value, the normal rotation or the reverse rotation of the crankshaft is detected. Whether or not the crankshaft is rotating normally is determined based on engine rotating speed, a cylinder in which a piston is in a predetermined position, an engine load, a starter switch, intake pressure, battery voltage, and the like. When the condition for the normal rotation is satisfied, the threshold of the pulse width is set based on a pulse width of a rotation signal measured at this time.

17 Claims, 7 Drawing Sheets

(56) References Cited

U.S. PATENT DOCUMENTS

| | | | |
|---|---|---|---|
| 7,059,300 B2 * | 6/2006 | Ikeda | 123/406.55 |
| 7,191,746 B2 * | 3/2007 | Nakamura | 123/179.3 |
| 7,204,222 B2 * | 4/2007 | Yamauchi et al. | 123/179.4 |
| 7,263,959 B2 * | 9/2007 | Kataoka et al. | 123/179.4 |
| 7,461,621 B2 * | 12/2008 | Ota et al. | 123/179.4 |
| 7,703,424 B2 * | 4/2010 | Nakamura et al. | 123/90.16 |
| 8,036,817 B2 * | 10/2011 | Ota et al. | 701/113 |
| 8,095,298 B2 * | 1/2012 | Nakamura et al. | 701/112 |
| 8,408,177 B2 * | 4/2013 | Nagoshi et al. | 123/179.4 |
| 2001/0002791 A1 * | 6/2001 | Tsuge et al. | 324/174 |
| 2001/0043055 A1 * | 11/2001 | Tanaka et al. | 322/28 |
| 2003/0041847 A1 * | 3/2003 | Shin | 123/631 |
| 2004/0011122 A1 * | 1/2004 | Shimizu | 73/118.1 |
| 2004/0089272 A1 * | 5/2004 | Kanazawa et al. | 123/476 |
| 2004/0107928 A1 * | 6/2004 | Asada et al. | 123/90.16 |
| 2005/0139194 A1 * | 6/2005 | Ikeda | 123/406.55 |
| 2005/0178594 A1 * | 8/2005 | Yamauchi et al. | 180/65.2 |
| 2005/0211207 A1 * | 9/2005 | Urushihata et al. | 123/90.17 |
| 2006/0260573 A1 * | 11/2006 | Urushihata et al. | 123/90.15 |
| 2007/0062476 A1 * | 3/2007 | Ota et al. | 123/179.4 |
| 2008/0051980 A1 * | 2/2008 | Mizuno | 701/105 |
| 2009/0020100 A1 * | 1/2009 | Sakaigaki et al. | 123/350 |
| 2009/0241883 A1 * | 10/2009 | Nagoshi et al. | 123/179.4 |

FOREIGN PATENT DOCUMENTS

| | | |
|---|---|---|
| JP | 2003-184516 A | 7/2003 |
| JP | 2003-232255 A | 8/2003 |
| JP | 2004-52698 A | 2/2004 |
| JP | 2004-257249 A | 9/2004 |
| JP | 2005-042589 A | 2/2005 |
| JP | 2005-171963 A | 6/2005 |
| JP | 2005-233622 A | 9/2005 |
| JP | 2006-207565 A | 8/2006 |
| JP | 2007-120406 A | 5/2007 |
| JP | 2009-2193 A | 1/2009 |
| JP | 2009-24548 A | 2/2009 |
| JP | 2010-190190 A | 9/2010 |

OTHER PUBLICATIONS

Japanese Office Action with partial English translation thereof Dated Jun. 18, 2013 {Four (4) Pages}.

* cited by examiner

ROTATION DETECTING DEVICE AND ROTATION DETECTING METHOD

BACKGROUND OF THE INVENTION

1. Field of the Invention

The present invention relates to a rotation detecting device and a rotation detecting method for determining normal rotation/reverse rotation of a rotating shaft based on rotation signals different between normal rotation and reverse rotation of the rotating shaft.

2. Description of Related Art

In Japanese Laid-open (Kokai) Patent Application Publication No. 2009-002193, an engine control apparatus including a detector for outputting rotation signals in synchronization with rotation of a crankshaft of an engine, is disclosed. Here, the detector outputs the rotation signals of different pulse widths depending on whether the crankshaft is rotating normally or reversely. The control apparatus measures the pulse width of the rotation signal and determines the normal rotation/reverse rotation of the crankshaft based on whether or not the measured value of the pulse width is greater than a threshold value.

However, if the pulse width of the rotation signal varies due to variation between detectors or deterioration of the detector, it reduces accuracy of determination of the normal rotation/reverse rotation based on comparison between the measured value of the pulse width and the threshold value.

SUMMARY OF THE INVENTION

Therefore, an object of the present invention is to provide a rotation detecting device and a rotation detecting method capable of keeping stable accuracy of determination of normal rotation/reverse rotation of a rotating shaft.

To achieve the above object, a rotation detecting device according to the present invention includes: a first determination unit for determining normal rotation/reverse rotation of a rotating shaft based on a rotation signal output as the rotating shaft rotates and different between the normal rotation and the reverse rotation of the rotating shaft and a threshold value; a second determination unit for determining whether or not a condition for rotation in one direction of the rotating shaft is satisfied; and a setting unit for setting the threshold value based on the rotation signal when the condition for the rotation in the one direction of the rotating shaft is satisfied.

A rotation detecting method according to the present invention includes the steps of: inputting a rotation signal output as the rotating shaft rotates and different between the normal rotation and the reverse rotation of the rotating shaft; determining the normal rotation/reverse rotation of the rotating shaft based on the rotation signal and a threshold value; determining whether or not a condition for rotation in one direction of the rotating shaft is satisfied; and changing the threshold value based on the rotation signal when the condition for the rotation in the one direction of the rotating shaft is satisfied.

The other objects and features of this invention will become understood from the following description with reference to the accompanying drawings.

DESCRIPTION OF THE PREFERRED EMBODIMENT

Figure 1:
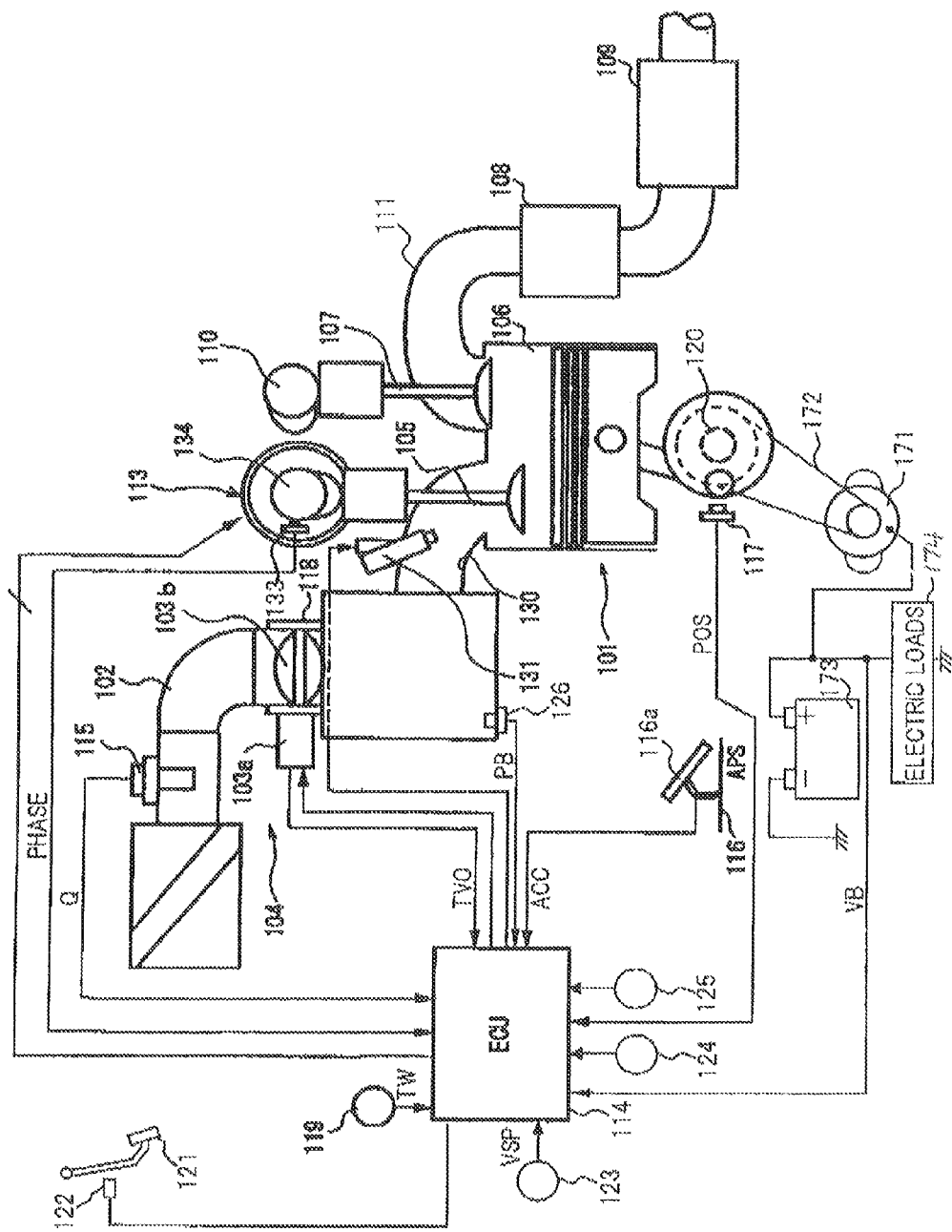
FIG. 1 is a view showing an internal combustion engine in an embodiment of the invention of the present application.

FIG. 1 is a view showing an internal combustion engine 101 for a vehicle and a rotation detecting device and a rotation detecting method according to the invention of the present application is applied to internal combustion engine 101. In the embodiment, internal combustion engine 101 is an in-line four-cylinder engine.

In FIG. 1, in an intake pipe 102 of internal combustion engine 101, an electronically-controlled throttle 104 in which a throttle valve 103b is driven to open and close by a throttle motor 103a is disposed.

Internal combustion engine 101 sucks air into a combustion chamber 106 of each cylinder through electronically-controlled throttle 104 and an intake valve 105.

A fuel injection valve 131 is provided in an intake port 130 of each cylinder. Fuel injection valve 131 opens and injects fuel in response to an injection pulse signal from an ECU (engine control unit) 114.

Fuel in combustion chamber 106 is ignited and burned by spark ignition by an ignition plug (not shown).

Combustion gas in combustion chamber 106 flows out into an exhaust pipe 111 through an exhaust valve 107 and a front catalyst converter 108 and a rear catalyst converter 109 provided in exhaust pipe 111 purify exhaust gas flowing through exhaust pipe 111.

An intake cam shaft 134 and an exhaust cam shaft 110 are integrally provided with cams and cause intake valve 105 and exhaust valve 107 to operate with the cams.

A variable valve timing mechanism 113 provided to intake cam shaft 134 is a mechanism for continuously changing a rotation phase of intake cam shaft 134 with respect to a crankshaft (output shaft, rotating shaft) 120 to thereby continuously change valve timing of intake valve 105.

Figure 2:
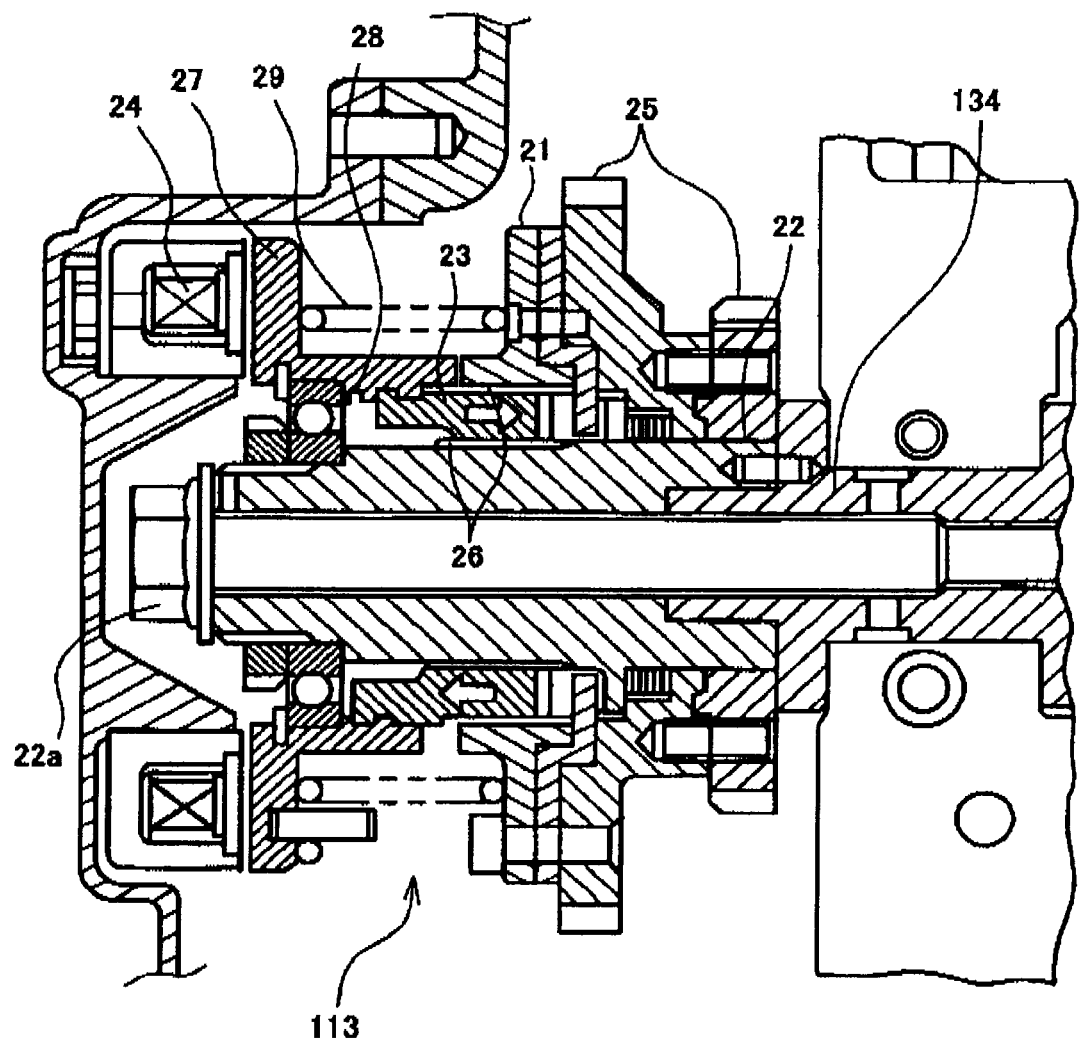
FIG. 2 is a sectional view showing a variable valve timing mechanism in the embodiment of the invention of the application.

FIG. 2 shows a structure of variable valve timing mechanism 113.

Variable valve timing mechanism 113 includes a first rotating body 21 fixed to sprockets 25 rotating in synchronization with rotation of crankshaft 120 to rotate integrally with sprockets 25, a second rotating body 22 fixed by a bolt 22a to one end of intake cam shaft 134 to rotate integrally with intake cam shaft 134, and a cylindrical intermediate gear 23 engaged with an inner peripheral face of first rotating body 21 and an outer peripheral face of second rotating body 22 through helical splines 26.

To intermediate gear 23, a drum 27 is connected through a multiple thread 28 such as a triple thread, and between drum 27 and intermediate gear 23 a torsion spring 29 is disposed.

Intermediate gear 23 is biased in a retarding direction (leftward in FIG. 2) of the valve timing by torsion spring 29. When an electromagnetic retarder 24 generates a magnetic force, intermediate gear 23 moves in an advancing direction (rightward in FIG. 2) through drum 27 and multiple thread 28.

According to an axial position of intermediate gear 23, relative phases of rotating bodies 21 and 22 change and the phase of intake cam shaft 134 with respect to crankshaft 120 changes.

ECU 114 controls electromagnetic retarder 24 according to an operating state of internal combustion engine 101.

Variable valve timing mechanism 113 is not limited to the structure shown in FIG. 2 and a known mechanism for changing the rotation phase of the cam shaft with respect to the crankshaft may be suitably adopted instead. For example, it is possible to change the valve timing of intake valve 105 by adopting a variable valve timing mechanism having a scroll-shaped guide disclosed in Japanese Laid-open (Kokai) Patent Application Publication No. 2003-184516 and a hydraulic vane type variable valve timing mechanism disclosed in Japanese Laid-open (Kokai) Patent Application Publication No. 2007-120406.

Internal combustion engine 101 also includes an alternator (generator) 171. Rotation of crankshaft 120 is transmitted to alternator 171 by a transmission mechanism 172 and, as a result, alternator 171 rotates at a speed proportional to rotation of internal combustion engine 101 to come into a state in which it is possible to generate electricity.

To an output terminal of alternator 171a plus terminal of a battery 173 and electric loads 174 are connected, alternator 171 charges battery 173, electric current generated by alternator 171 is supplied to fuel injection valve 131 and constantly-driven electric loads 174 such as a ignition coil (not shown), and the generated electric current is supplied to electric loads 174 such as headlights, windshield wipers, and an air conditioner as necessary.

ECU 114 includes a microcomputer, performs arithmetic according to a program stored in memory, and controls electronically-controlled throttle 104, variable valve timing mechanism 113, fuel injection valve 131, and the like.

Detection signals from various sensors are input to ECU 114. As the various sensors, internal combustion engine 101 includes an accelerator opening degree sensor 116 provided to an accelerator pedal 116a to detect an accelerator opening degree ACC, an air flow sensor 115 for detecting an intake air quantity Q of internal combustion engine 101, a crank angle sensor 117 for outputting pulse-like rotation signals POS as crankshaft 120 rotates, a throttle sensor 118 for detecting an opening degree TVO of throttle valve 103b, a water temperature sensor 119 for detecting temperature TW of cooling water of internal combustion engine 101, a cam sensor 133 for outputting a pulse-like cam signal PHASE as intake cam shaft 134 rotates, a brake switch 122 that is turned on at the time of braking when a brake pedal 121 is pressed, a vehicle speed sensor 123 for detecting traveling speed VSP of the vehicle, an intake pressure sensor 126 for detecting intake pressure PB, and the like.

Moreover, ON/OFF signals of an ignition switch 124 that is a main switch for operation and a stop of internal combustion engine 101, ON/OFF signals of a starter switch 125, and a voltage signal VB of battery 173 are input to ECU 114.

Figure 3A:
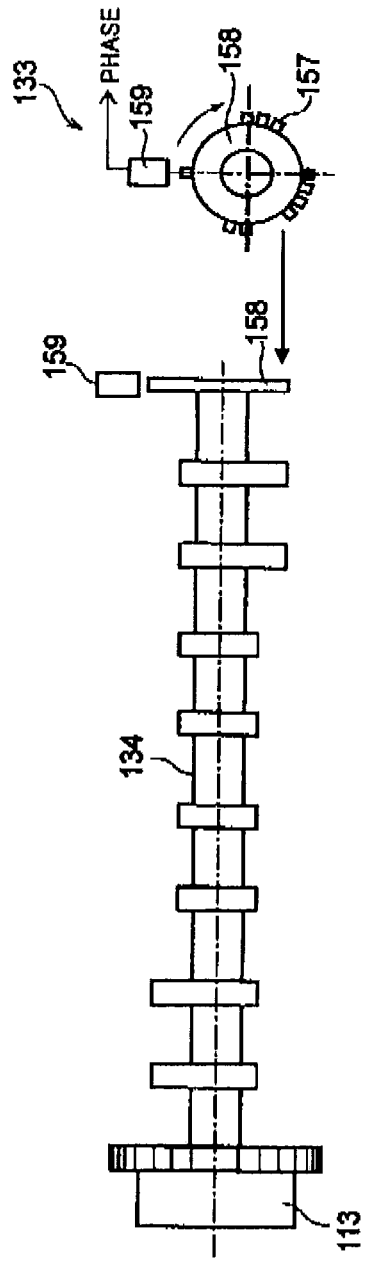
FIGS. 3A and 3B are a view showing structures of a crank angle sensor and a cam sensor in the embodiment of the invention of the application.
Figure 3B:
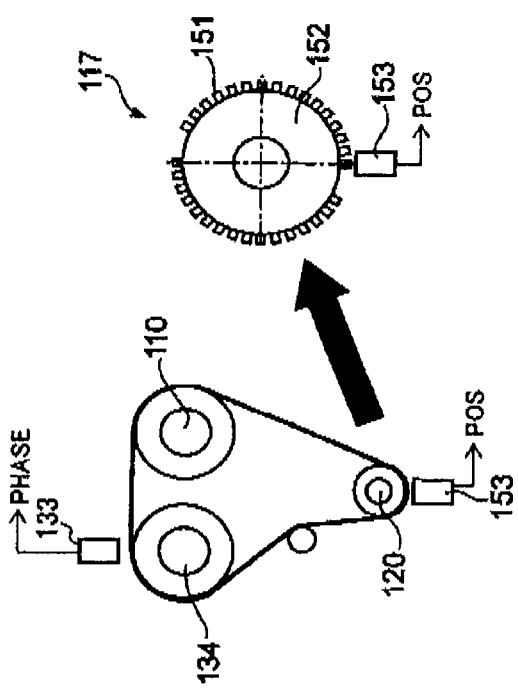

FIGS. 3A and 3B show structures of crank angle sensor 117 and cam sensor 133.

Crank angle sensor 117 includes a signal plate 152 axially supported on crankshaft 120 and provided at its periphery with protruding portions 151 as detected portions and a rotation detecting device 153 fixed to internal combustion engine 101 to detect protruding portions 151 to output rotation signals POS.

Rotation detecting device 153 has various processing circuits including a waveform generating circuit, a selection circuit, and the like as well as a pickup for detecting protruding portions 151. The rotation signals POS output from rotation detecting device 153 are normally at a low level and shift to a high level for a certain time period only when protruding portions 151 are detected.

Protruding portions 151 of signal plate 152 are provided at regular intervals with a pitch of 10 degrees of the crank angle. Two successive protruding portions 151 are lacked at each of two positions facing each other on opposite sides of a center of the rotation of crankshaft 120.

Number of lacked protruding portions 151 may be one or three or more successive protruding portions 151 may be lacked.

Figure 4:
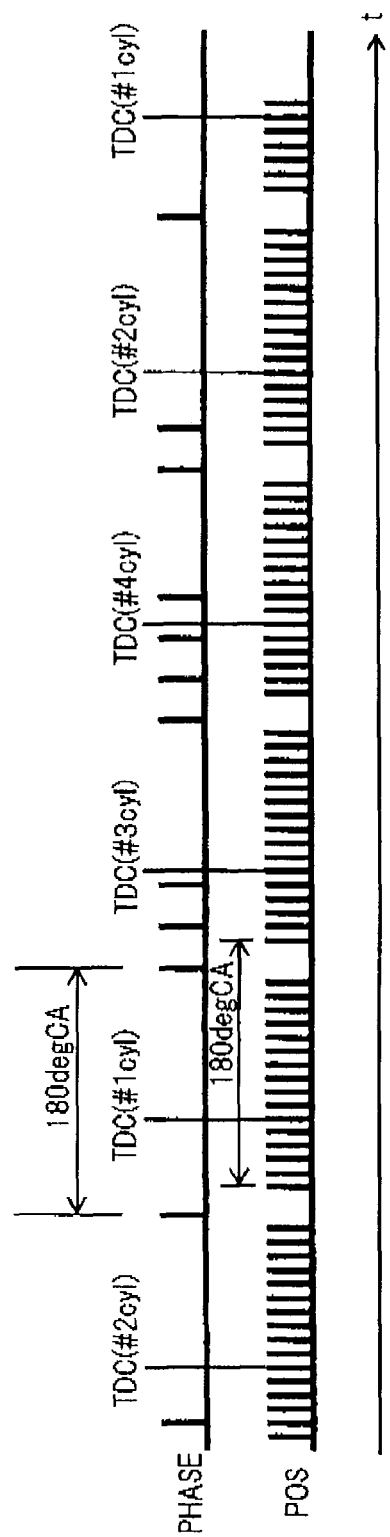
FIG. 4 is a timing chart showing output characteristics of the crank angle sensor and the cam sensor in the embodiment of the invention of the application.

Therefore, as shown in FIG. 4, the pulse-like rotation signals POS output from crank angle sensor 117 shift to the high level 16 times successively for each 10 degrees of the crank angle that is a unit crank angle, and then are kept at the low level for 30 degrees, and then shift to the high level 16 times successively again.

Therefore, the first rotation signals POS after the low-level periods for 30 degrees are output at intervals of 180 degrees of the crank angle and the 180-degree crank angle corresponds to stroke phase differences, i.e., ignition intervals between the cylinders in four-cylinder engine 101 of the embodiment.

On the other hand, cam sensor 133 includes a signal plate 158 axially supported on an end portion of intake cam shaft 134 and provided at its periphery with protruding portions 157 as detected portions and a rotation detecting device 159 fixed to internal combustion engine 101 to detect protruding portions 157 to output the cam signals PHASE.

Rotation detecting device 159 has various processing circuits including a waveform shaping circuit as well as a pickup for detecting protruding portions 157.

One, three, four, and two protruding portions 157 of signal plate 158 are respectively provided at four positions at intervals of 90 degrees of the cam angle. At portions where a plurality of protruding portions 157 are provided successively, a pitch of protruding portions 157 is 30 degrees of the crank angle and 15 degrees of the cam angle.

As shown in FIG. 4, the cam signals PHASE that are pulse signals output from cam sensor 133 are normally at a low level and shift to a high level for a certain time when protruding portion 157 is detected and a single signal, three successive, four successive, and two successive signals shift to the high level at intervals of 90 degrees of the cam angle and 180 degrees of the crank angle.

The single cam signal PHASE and the first signal of the plurality of successively output cam signals PHASE are output at intervals of 180 degrees of the crank angle.

The numbers of successively output cam signals PHASE represent cylinder numbers and correspond to facts that stroke phase differences between the cylinders in four-cylinder engine 101 of the embodiment are 180 degrees of the crank angle and that ignition is performed in the first cylinder, the third cylinder, the fourth cylinder, and the second cylinder, in this order.

ECU 114 counts the number of successively output cam signals PHASE to thereby discriminate the cylinder in which a piston position is a predetermined position such as a top dead center TDC, identifies the cylinder in which the fuel injection or ignition should be performed based on a result of the discrimination, and individually outputs the injection pulse signal or an ignition signal to each cylinder.

For example, the lacked position of the rotation signals POS is determined based on a change in a cycle of the rotation signals POS, a section corresponding to 180 degrees of the crank angle in which the number of generated cam signals PHASE is to be counted is identified based on the signal lacked portion, and the cylinder in which the piston reaches the top dead center TDC next is detected based on the number of generated cam signals PHASE in the counting section.

Here, phases of the rotation signals POS and the cam signals PHASE change when variable valve timing mechanism 113 changes the rotation phase of intake cam shaft 134 with respect to crankshaft 120.

Therefore, ECU 114 detects a reference crank angle position REF based on the lacked portion of the rotation signals POS and detects an angle from the reference crank angle position REF to a position where the cam signal PHASE is output as a value representing the rotation phase of intake cam shaft 134 by variable valve timing mechanism 113.

In control of variable valve timing mechanism 113, ECU 114 computes a target rotation phase based on the engine operating states such as an engine load and engine rotating speed, computes a manipulated value of electromagnetic retarder 24 by PID algorithm based on a deviation of an actual rotation phase and the target rotation phase from each other, and drives electromagnetic retarder 24 based on the manipulated value.

As described above, ECU 114 detects the rotation phase of intake cam shaft 134 based on the rotation signals POS, computes the engine rotating speed NE based on the rotation signals POS, and also detects a rotating position of crankshaft 120 based on the rotation signals POS.

In other words, rotation signal POS also functions as a measurement signal of the rotating position of crankshaft 120 and ECU 114 counts the number of generated rotation signals POS from the lacked portion of the rotation signals POS or the reference crank angle position REF detected based on the lacked portion to thereby detect the rotating position of crankshaft 120.

However, crankshaft 120 may rotate in a reverse direction depending on compression pressure in the cylinder in some cases immediately before internal combustion engine 101 stops. If the number of generated rotation signals POS is counted in the reverse rotation in the same manner as in the normal rotation, an error may occur in detection of a stop position of crankshaft 120.

Figure 5:
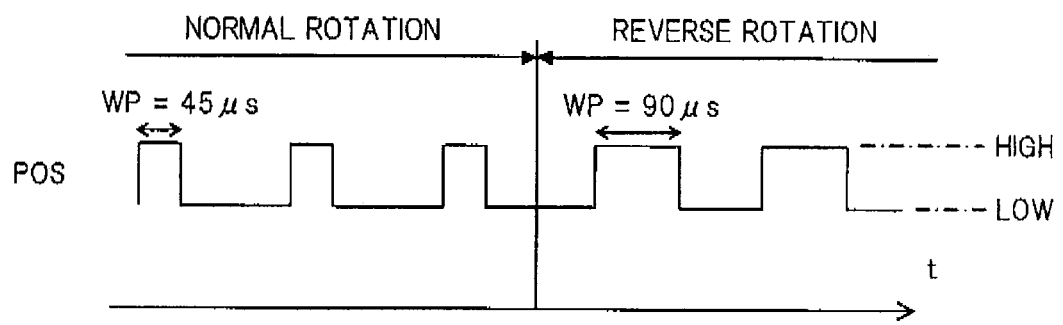
FIG. 5 is a timing chart showing a difference in a pulse width of a rotation signal POS between normal rotation and reverse rotation in the embodiment of the invention of the application.

Therefore, crank angle sensor 117 outputs the rotation signals POS of different pulse widths between the normal rotation and the reverse rotation of crankshaft 120 so that ECU 114 can discriminate between the normal rotation and the reverse rotation of internal combustion engine 101 (see FIG. 5).

As a method of generating the pulse signals of different pulse widths depending on a rotating direction of the rotating shaft, a method disclosed in Japanese Laid-open (Kokai) Patent Application Publication No. 2001-165951 is adopted, for example. Specifically, two signals with a phase difference from each other are generated as detection pulse signals of protruding portions 151 of signal plate 152, the normal rotation/reverse rotation is determined by comparing these signals, and one of two pulse signals with different pulse widths WP is selected and output based on a result of determination of the normal rotation/reverse rotation.

ECU 114 measures pulse width WP of rotation signal POS and compares the measured pulse width WP and a threshold value SL of pulse width WP to thereby determine whether it is pulse width WP in the normal rotation or pulse width WP in the reverse rotation and determine whether crankshaft 120 that is the output shaft of internal combustion engine 101 is rotating normally or reversely.

As shown in FIG. 5 of the embodiment, although pulse width WP in the normal rotation is set at 45 µs and pulse width WP in the reverse rotation is set at 90 µs, the pulse widths WP are not limited to 45 µs and 90 µs. It is also possible that pulse width WP in the normal rotation is greater than that in the reverse rotation.

In the example shown in FIG. 5, although the rotation signals POS are the pulse signals that are normally at the low level and shift to the high level for a certain time period when a predetermined angle position is reached, they may be pulse signals that are normally at the high level and shift to the low level for a certain time period when the predetermined angle position is reached. In this case, different time periods at the low level are set for different rotating directions and the time period at the low level is measured as pulse width WP to thereby determine the rotating direction.

Threshold value SL of pulse width WP used for determination of the normal rotation/reverse rotation is set at an intermediate value between pulse width WP in the normal rotation and pulse width WP in the reverse rotation. ECU 114 determines that crankshaft 120 is rotating reversely when the measured pulse width WP is threshold value SL or greater and that crankshaft 120 is rotating normally when pulse width WP is smaller than threshold value SL.

When crankshaft 120 is rotating normally, ECU 114 determines that crankshaft 120 has rotated since the last time in the normal direction through a crank angle corresponding to an interval between the generated rotation signals POS when rotation signal POS is output. When crankshaft 120 is rotating reversely, ECU 114 determines that crankshaft 120 has rotated since the last time in the reverse direction through a crank angle corresponding to an interval between the generated rotation signals POS when rotation signal POS is output.

ECU 114 detects the stop position of crankshaft 120 by continuing detection of the rotation angle of crankshaft 120 based on the determination of the normal rotation/reverse rotation until internal combustion engine 101 stops.

As described above, by determining the normal rotation/reverse rotation and detecting the rotating position of crankshaft 120, it is possible to accurately determine the stop position of crankshaft 120 even if crankshaft 120 rotates reversely immediately before internal combustion engine 101 stops. By storing the stop position of crankshaft 120 and assuming that crankshaft 120 starts rotating from the stored stop position at the time of restart, it is possible to start the fuel injection and ignition early.

For example, when the stop position of crankshaft 120 is unknown because of the reverse rotation of crankshaft 120 immediately before the stop of internal combustion engine 101, the rotating position of crankshaft 120 is unknown until the lacked portion of rotation signal POS is detected for the first time and start of the fuel injection and ignition is delayed at the time of restart.

In the embodiment, when ECU 114 determines that idle reduction conditions are satisfied in an idle state of internal combustion engine 101, it automatically stops internal combustion engine 101. If ECU 114 determines that restart conditions are satisfied after internal combustion engine 101 is automatically stopped, it carries out an idle reduction control for automatically restarting internal combustion engine 101.

Here, if the fuel injection and ignition can be started early in automatically restarting internal combustion engine 101, it is possible to improve restarting performance of internal combustion engine 101.

In the idle reduction control, ECU 114 determines that the idle reduction conditions (idle reduction conditions) are satisfied, stops the fuel injection and ignition, and stops internal combustion engine 101 when the vehicle speed VSP is 0 km/h, the engine rotating speed NE is predetermined rotating speed or lower, the accelerator opening degree ACC is the maximum, and brake switch 122 is in the ON state representing the braking state, the temperature TW of the cooling water is a predetermined temperature or higher, and the like are all satisfied, for example.

The predetermined rotating speed is a value for determining the idle running state of internal combustion engine 101 and is set to be slightly higher than target idle rotating speed. The predetermined temperature is a value for determining a completely warmed-up state of internal combustion engine 101.

On the other hand, ECU 114 determines that the restart conditions are satisfied and restarts the fuel injection and ignition for internal combustion engine 101 when brake switch 122 is turned off, the accelerator pedal is pressed, a duration time of the automatically stopped state becomes longer than a reference time, and reduction in the battery voltage is determined, for example, in the automatically stopped state of internal combustion engine 101.

At the time of restart, it is possible to start rotating internal combustion engine 101 by using a starter motor or with pressure generated by combustion of fuel in the combustion chamber without using the starter motor.

The normal rotation/reverse rotation of crankshaft 120 is determined by comparing pulse width WP of rotation signal POS with threshold value SL as described above. However, the measured value of pulse width WP of rotation signal POS varies due to variations in crank angle sensor 117 and ECU 114 for measuring pulse width WP.

Therefore, if threshold value SL is given in advance as a fixed value, it may be impossible to correctly determine the normal rotation/reverse rotation of crankshaft 120.

Therefore, ECU 114 has a function of learning threshold value SL in which threshold value SL is set based on the measured values of pulse width WP to be stored it, and the normal rotation/reverse rotation is determined based on the stored threshold value SL.

The leaning function of threshold value SL of ECU 114 will be described below according to flowcharts in FIGS. 6 and 7.

Figure 6:
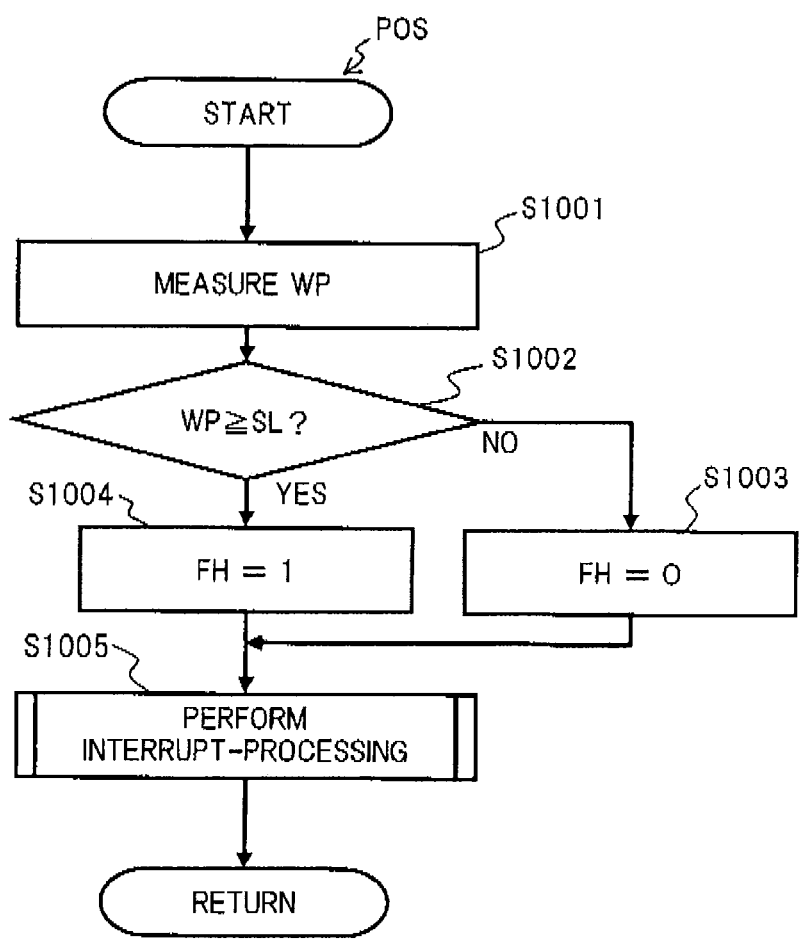
FIG. 6 is a flowchart showing determination processing of the normal rotation/reverse rotation in the embodiment of the invention of the application.

The flowchart in FIG. 6 shows a routine that ECU 114 performs every time rotation signal POS is generated.

In step S1001, pulse width WP of rotation signal POS is measured.

Specifically, a leading edge and a falling edge of rotation signal POS are detected, a time between the leading edge and the falling edge is measured, and the measured time is used as pulse width WP.

In next step S1002, pulse width WP measured in step S1001 and threshold value SL are compared. If pulse width WP is smaller than threshold value SL, it is determined that crankshaft 120 is rotating normally. The routine proceeds to step S1003 where "0" is set in a flag FH.

On the other hand, if it is determined that pulse width WP is threshold value SL or greater in step S1002, it is determined that crankshaft 120 is rotating reversely, the routine proceeds to step S1004, and 1 is set in the flag FH.

In other word, if the flag FH is 1, it represents the reverse rotation of crankshaft 120. If the flag FH is "0", it represents the normal rotation of crankshaft 120.

In step S1005, interrupt-processing other than the determination of the normal rotation/reverse rotation is performed every time rotation signal POS is generated.

The interrupt-processing includes detection of the rotating position of crankshaft 120 by counting up the rotation signals POS, detection of the lacked portion of the rotation signals POS, and the like.

Figure 7:
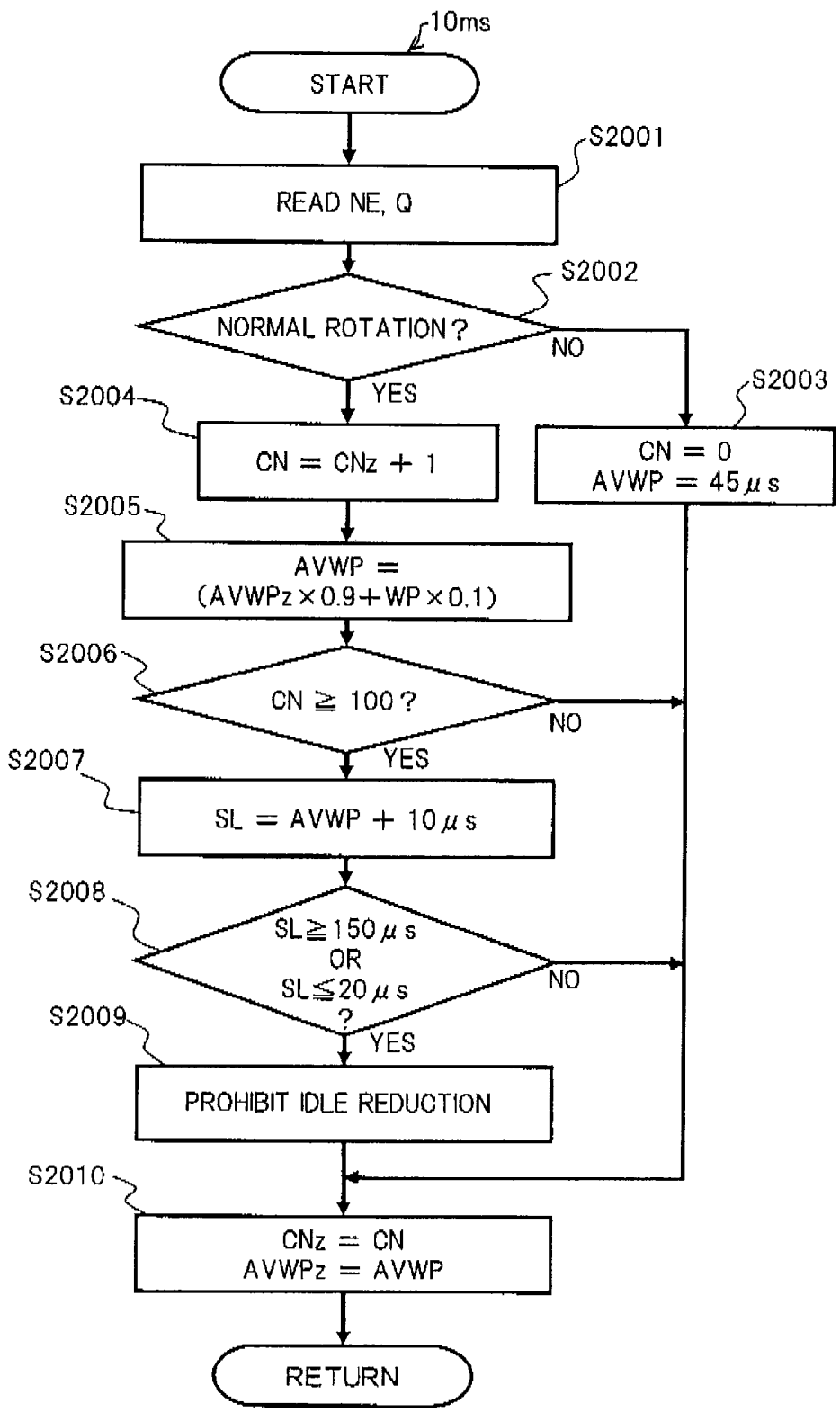
FIG. 7 is a flowchart showing threshold value setting processing in the embodiment of the invention of the application.

On the other hand, the flowchart in FIG. 7 shows an interrupt-processing routine performed every certain time (e.g., 10 ms) in ECU 114.

In step S2001, information about the operating state of internal combustion engine 101 such as the engine rotating speed NE, the ON/Off signal of starter switch 125, and intake air quantity Q detected by air flow sensor 115 is read in.

In next step S2002, whether or not a condition for the normal rotation of crankshaft 120 is satisfied is determined based on data indicating the engine operating conditions read in step S2001.

Specifically, it is determined that the condition for the normal rotation of crankshaft 120 is satisfied when at least one of the following conditions (1) to (6) is satisfied.

If the normal rotation is determined based on the fact that more than one of the following conditions (1) to (6) are satisfied, it is possible to enhance determination accuracy of the normal rotation/reverse rotation:

(1) The engine rotating speed NE is predetermined rotating speed NES or higher;

(2) The cylinder of which piston position is determined to be in the predetermined position based on the cam signal PHASE has moved on along the normal direction;

(3) The engine load TP is a predetermined load TPS or higher;

(4) The ON state of starter switch 125;

(5) The state in which intake pressure PB has increased or reduced a predetermined value or more from the atmospheric pressure; and (6) The battery voltage VB is predetermined voltage VBS or higher.

The condition (1) is for determining whether or not the engine rotating speed NE, i.e., the rotating speed of crankshaft 120 has increased. The predetermined rotating speed NES is set at rotating speed that is not reached when crankshaft 120 is rotating reversely. The predetermined rotating speed NES is 500 rpm, for example.

In other words, the maximum value of the engine rotating speed NE during the reverse rotation of internal combustion engine 101 is lower than the maximum value of the engine rotating speed NE during the normal rotation of internal combustion engine 101, and therefore it is determined that crankshaft 120 is rotating normally when the engine rotating speed NE has reached the rotating speed higher than the maximum value of the engine rotating speed NE during the reverse rotation.

The condition (2) is for determining whether or not the cylinder of which piston position is determined by ECU 114 to be the predetermined position based on the cam signal PHASE has been updated in an order in the normal rotation of internal combustion engine 101. As described above, the ignition order of internal combustion engine 101 is the first cylinder→the third cylinder→the fourth cylinder→the second cylinder, which is the updating order in the normal rotation of internal combustion engine 101. When the cylinder in which it is determined that the piston is in the predetermined position has been renewed according to this order, crankshaft 120 is rotating normally.

The condition (3) is for determining whether or not engine 101 is operating under the engine load that can be achieved only in the normal rotating state of internal combustion engine 101. Therefore, the predetermined load TPS is set at the engine load higher than that in a low-load state in which internal combustion engine 101 shifts from the normal rotation to the reverse rotation immediately before the stop. When internal combustion engine 101 is operating under the engine load TP equal to or higher than the predetermined load TPS, it is determined that crankshaft 120 is rotating normally.

In other words, when internal combustion engine 101 is rotating reversely, internal combustion engine 101 does not operate under the engine load hither than the predetermined load TPS. When the engine load is the predetermined load TPS or higher, it is determined that crankshaft 120 is rotating normally.

As a state quantity indicating the engine load, it is preferable to use the state quantity such as intake air quantity Q detected by air flow sensor 115 and a fuel injection quantity calculated based on intake air quantity Q indicating a quantity of air drawn into internal combustion engine 101.

Here, the higher the predetermined load TPS, the higher the determination accuracy of the normal rotating state becomes. However, it is possible to obtain necessary and sufficient determination accuracy by setting the predetermined load TPS at such a value that satisfaction of the condition (4) is recognized during idling of internal combustion engine 101, for example.

The condition (4) is for determining whether or not it is a state of starting operation of internal combustion engine 101. When starter switch 125 is in the ON state and it is a cranking state for rotating internal combustion engine 101 with the starter motor, crankshaft 120 rotates in a rotating direction of the starter motor, i.e., in the normal direction. Therefore, when starter switch 125 is in the ON state, i.e., it is the state of the starting operation of internal combustion engine 101, it is determined that crankshaft 120 is rotating normally.

The condition (5) is for determining a state of building up of intake pressure PB that is pressure in intake pipe 102, i.e., whether or not intake pressure PB has changed the predetermined value or more from the atmospheric pressure.

The reverse rotation of crankshaft 120 occurs immediately before the stop of internal combustion engine 101 and intake pressure PB in this case is around the atmospheric pressure. In other words, when intake pressure PB has changed the predetermined value or more from the atmospheric pressure, it is determined that crankshaft 120 is rotating normally. Whether or not intake pressure PB has changed the predetermined value or more from the atmospheric pressure can be determined by comparing intake pressure PB and the predetermined pressure PBS.

As described above, because intake pressure PB is around the atmospheric pressure during the reverse rotation, the predetermined pressure PBS is set at intake pressure PB that is higher or lower than the atmospheric pressure by the predetermined pressure or more and that is not reached during the reverse rotation of crankshaft 120 and it is determined that crankshaft 120 is in the normal rotating state when intake pressure PB is higher or lower than the predetermined pressure PBS by the predetermined pressure PBS.

Here, when internal combustion engine 101 is a naturally aspirated engine, intake pressure PB is around the atmospheric pressure in a full open operation state. Therefore, the predetermined pressure PBS is set at negative pressure and it is determined that crankshaft 120 is rotating normally when intake pressure PB is a negative value larger than or equal to the predetermined pressure PBS, i.e., when internal combustion engine 101 is operating under a low load with large intake negative pressure.

When internal combustion engine 101 has a supercharger, intake pressure PB becomes higher than the atmospheric pressure due to supercharging. Therefore, the predetermined pressure PBS is set at positive pressure and it is determined that crankshaft 120 is rotating normally in an increased state of the engine load in which intake pressure PB is a positive value larger than the predetermined pressure PBS.

The condition (6) is for determining that it is during electric power generation by alternator 171 driven by internal combustion engine 101 based on the battery voltage VB.

Alternator 171 generates electric power by rotating normally internal combustion engine 101 and the battery voltage VB increases by alternator 171 generating the electric power. Therefore, the predetermined voltage VBS is set at the battery voltage VB reached when alternator 171 generates electric power.

As a result, it is determined that alternator 171 is generating electric power when the battery voltage VB is the predetermined voltage VBS or higher and it is determined that crankshaft 120 is rotating normally when alternator 171 is generating electric power.

If internal combustion engine 101 is the naturally aspirated engine, intake pressure PB approaches the atmospheric pressure from the negative pressure as the engine load increases and intake pressure PB is around the atmospheric pressure even in the reverse rotating state as described above. To determine the engine load based on intake pressure PB, pressure around the atmospheric pressure is excluded from a normal rotation determination region. When negative pressure is generated, it is determined that internal combustion engine 101 is rotating normally.

On the other hand, if internal combustion engine 101 has the supercharger, intake pressure PB increases to higher positive pressure from the atmospheric pressure due to increase in the engine load. Therefore, to determined the engine load based on intake pressure PB, it is determined that internal combustion engine 101 is rotating normally when intake pressure PB is higher than the atmospheric pressure by the predetermined pressure or more.

When it is determined that the engine rotating speed NE, the engine load TP, and the like do not satisfy the conditions for the normal rotation of crankshaft 120 in step S2002, i.e., when there is a possibility that crankshaft 120 is rotating reversely, the interrupt-processing routine proceeds to step S2003.

In step S2003, a counter CN for counting the number of samples of pulse width WP is reset to "0" and an average value AVWP of pulse width WP is reset to an initial value.

As the initial value, a design value of pulse width WP in the normal rotation is used. In the embodiment, the design value of pulse width WP in the normal rotation is 45 μs.

On the other hand, when it is determined that the engine rotating speed NE, the engine load TP, and the like satisfy the conditions for the normal rotation of crankshaft 120 in step S2002, i.e., when it is assumed that crankshaft 120 is rotating normally, the interrupt-processing routine proceeds to step S2004.

In step S2004, the counter CN is increased "1" from a previous value CNz.

In next step S2005, a weighted average of pulse width WP measured recently and a previous average value AVWPz is obtained and the weighted average value is used as a present average value AVWP.

$$AVWP = AVWPz \times 0.9 + WP \times 0.1$$

The smoothing processing of pulse width WP is not limited to the above-described weighted average arithmetic but may be simple average arithmetic or the like. Coefficients used for the weighted average arithmetic are not limited to the above coefficients either.

In step S2006, if a value of the counter CN is a determination value or greater is determined.

The determination value is 100, for example, and is set based on the number of samples sufficient to obtain the average value of the pulse widths WP of the rotation signals POS in the normal rotation.

If it is determined that the value of the counter CN is smaller than the determination value in step S2006, it is determined that reliability of the average value AVWP is insufficient and the interrupt-processing routine skips steps S2007 to S2009 and proceeds to step S2010.

In step S2010, the value of the counter CN that has been increased this time in step S2004 is set at the previous value CNz and the average value AVWP updated this time in step S2005 is set at the previous value AVWPz.

On the other hand, when it is determined that the value of the counter CN is the determination value or greater in step S2006, the interrupt-processing routine proceeds to step S2007.

In step S2007, a margin MA stored in advance is added to the average value AVWP updated this time in step S2005, a result of the addition is set as threshold value SL used for determination of the normal rotation/reverse rotation in step S1002, and the new threshold value SL is stored.

$$\text{Threshold value } SL = AVWP + \text{margin } MA$$

The margin MA is set at about 10 µs, for example, in the embodiment in which pulse width WP in the normal rotation is set at 45 µs and pulse width WP in the reverse rotation is set at 90 µs.

In other words, it is determined that crankshaft 120 is rotating reversely when pulse width WP becomes equal to or longer than the time obtained by adding the margin MA to the average value AVWP of the pulse width in the normal rotation.

The margin MA is suitably adjusted in advance by including a difference between a standard pulse width WP in the normal rotation and a standard pulse width WP in the reverse rotation, variation in pulse width WP, and the like and stored. It is possible to set the margin MA at a different value based on whether pulse width WP in the normal direction becomes smaller or greater than the standard value or it is possible to correct the margin MA based on pulse width WP determined as the pulse width in the reverse rotation based on threshold value SL set based on the margin MA.

In a setting in which pulse width WP in the normal rotation is greater than pulse width WP in the reverse rotation, a result of subtraction of the margin MA from the average value AVWP may be used as threshold value SL.

As described above, if threshold value SL is learned based on pulse width WP measured when crankshaft 120 is rotating normally, it is possible to change threshold value SL, when the measured value of pulse width WP varies with respect to the design value due to various factors, to adapt to the variation to thereby enhance the determination accuracy of the normal rotation/reverse rotation.

If the determination accuracy of the normal rotation/reverse rotation is enhanced, determination accuracy of the stop position of internal combustion engine 101 is enhanced, the fuel injection and the ignition at the time of restart from the idle reduction state can be controlled swiftly with high accuracy, and the restarting performance of internal combustion engine 101 can be improved.

In step S2008, whether threshold value SL updated in step S2007 is a value higher than or equal to a maximum value, or a value lower than or equal to a minimum value are determined.

In the embodiment in which pulse width WP in the normal rotation is set at 45 µs and pulse width WP in the reverse rotation is set at 90 µs, the maximum value is set at 150 µs, for example, and the minimum value is set at 20 µs, for example.

The maximum value and the minimum value are set based on a range of variation in pulse width WP and set at values that threshold value SL does not exceed with acceptable variation in pulse width WP.

In other words, threshold value SL changes within a range between the maximum value and the minimum value in response to the acceptable variation in pulse width WP. When pulse width WP varies while exceeding the acceptable range due to an abnormal condition of crank angle sensor 117 or the like, threshold value SL outside the range between the maximum value and the minimum value is obtained by arithmetic.

Therefore, if it is determined that threshold value SL is a value higher than or equal to the maximum value or is a value lower than or equal to the minimum value in step S2008, pulse width WP of rotation signal POS is diagnosed as having varied while exceeding the acceptable range due to the abnormal condition of crank angle sensor 117.

When pulse width WP of rotation signal POS is abnormal, it is impossible to determine the normal rotation/reverse rotation based on determination of pulse width WP and, as a result, the restarting performance of internal combustion engine 101 lowers. Therefore, the interrupt-processing routine proceeds to step S2009 to prohibit idle reduction control.

In other words, if the determination of the normal rotation/reverse rotation based on pulse width WP of rotation signal POS becomes impossible, the stop position of internal combustion engine 101 is not detected correctly when internal combustion engine 101 rotates reversely immediately before the stop. As a result, it is impossible to set the fuel injection timing and the ignition timing at the time of restart based on the stop position.

Therefore, the fuel injection and the ignition cannot be started until the lacked position of the rotation signals POS is detected and the cylinder in which the piston is in the predetermined position is discriminated at the time of restart, which prolongs a starting time and lowers the restarting performance.

Therefore, the detection result of the stop position is invalidated by prohibiting the idle reduction in step S2009, so that the idle reduction is not executed with the lowered restarting performance, and then the interrupt-processing routine proceeds to step S2010.

However, at the time of restart, if the starting performance is lowered not so severely as to impair start acceleration performance even if the fuel injection and the ignition are started after the lacked position of the rotation signals POS is detected and the cylinder in which the piston is in the predetermined position is discriminated at the time of restart or if the lowering of the starting performance is allowed, detection of the stop position based on the determination of the normal rotation/reverse rotation may be prohibited or the detection result of the stop position may be invalidated and execution of the idle reduction control may be allowed.

On the other hand, in step S2008, when it is determined that threshold value SL is lower than the maximum value and higher than the minimum value, it is estimated that pulse width WP of rotation signal POS varies in the allowable range.

Therefore, when it is determined that threshold value SL is lower than the maximum value and higher than the minimum value in step S2008, the interrupt-processing routine skips the step S2009 and proceeds to the step S2010 to thereby allow the idle reduction control. In this case, detection of the stop position based on determination of the normal rotation/reverse rotation is carried out, the detection result is validated, and the angle position of crankshaft 120 is detected based on the stored stop position at the time of restart from the idle reduction.

Although it is determined that pulse width WP measured when the conditions for the normal rotation of crankshaft 120 are satisfied is the pulse width in the normal rotation and threshold value SL is learned from pulse width WP in the embodiment shown in the flowchart in FIG. 7, threshold value SL may be learned based on pulse width WP measured when a condition for the reverse rotation of crankshaft 120 is satisfied.

To learn threshold value SL based on pulse width WP in the reverse rotation, whether or not the condition for the reverse rotation is satisfied may be determined in step S2002 in the flowchart in FIG. 7 and "AVWP-margin MA" may be adopted as a new threshold value SL in step S2007.

In determination of the condition for the reverse rotation in step S2002, whether or not the condition for the reverse rotation of crankshaft 120 is satisfied may be determined by using a cycle or a cycle ratio of rotation signal POS as disclosed in Japanese Laid-open (Kokai) Patent Application Publication No. 2004-052698.

Specifically, when internal combustion engine 101 switches from the normal rotation to the reverse rotation immediately before the stop of internal combustion engine 101, the cycle TPOS of rotation signal POS becomes the long cycle TPOS that does not occur in the normal rotation. Therefore, it is determined that the condition for the reverse rotation of crankshaft 120 is satisfied when the cycle TPOS becomes longer than a determination value TSL. The determination value TSL is set at a value that the cycle TPOS does not exceed when internal combustion engine 101 stops in the normal rotation.

Alternatively, the cycle TPOS abruptly becomes long when internal combustion engine 101 switches from the normal rotation to the reverse rotation and the cycle ratio RT (RT=TPOS/TPOSz) that is a ratio between a latest value TPOS and a previous value TPSOz of the measured results of the cycle TPOS becomes a large ratio that does not occur in the normal rotation. Therefore, it is determined that the condition for the reverse rotation of crankshaft 120 is satisfied when the cycle ration RT becomes larger than the determination value RTS. The determination value RTS is set at a value that the cycle ratio RT does not exceed when internal combustion engine 101 stops in the normal rotating state.

Because there are signal lacked portions where the cycles TPOS of the rotation signals POS are longer than the normal cycles of 10 degrees in the embodiment, whether or not the cycle TPOS is the result of measurement of the signal lacked portion is determined to determine the condition for the reverse rotation based on the cycle TPOS as described above. To use the cycle TPOS of the signal lacked portion, the determination values TSL and RTS are switched to values adapted to the signal lacked portion.

If it is determined that the condition for the reverse rotation is satisfied, an average value AVWP of pulse width WP measured in the reverse rotation is obtained and threshold value SL is updated based on the average value AVWP.

Pulse width WP in the normal rotation is set at 45 μs and pulse width WP in the reverse rotation is set at 90 μs in the embodiment. Because pulse width WP in the reverse rotation is greater, threshold value SL is set at a value obtained by subtracting a margin MA from the average value AVWP of the pulse widths WP measured in the reverse rotation. The margin MA is set at about 10 μs similarly to that in the normal rotation.

Because a period for which crankshaft 120 continuously rotates in the reverse direction is short, the required number of samples to obtain the average value AVWP of the pulse widths WP may be fewer than that in the normal rotation.

If threshold values SL based on the average values AVWP of the pulse widths WP or the average values AVWP and the margins MA are calculated both when the conditions for the normal rotation are satisfied and when the condition for the reverse rotation is satisfied, respectively, threshold value SL finally used for determination of the normal rotation/reverse rotation may be set at an intermediate value between the average value AVWP and threshold value obtained SL obtained when the conditions for the normal rotation are satisfied and the average value AVWP and threshold value SL obtained when the condition for the reverse rotation is satisfied.

Here, the intermediate value may be a median of a region between the value in the normal rotation and the value in the reverse rotation.

Moreover, the value in the normal rotation and the value in the reverse rotation may be weighted according to a difference in reliability depending on the number of samples of the pulse widths WP when the average value AVWP is obtained and learning frequency to set threshold value SL.

Because internal combustion engine 101 operates much more frequently in the normal rotating state, reliability of the average value AVWP is higher in the normal rotation, in general.

Therefore, final threshold value SL can be set at a value deviated from the median of the region between the average value AVWP obtained in the normal rotation and threshold value SL set based on the average value AVWP and the average value AVWP obtained in the reverse rotation and threshold value SL set based on the average value AVWP toward the value in the normal rotation a predetermined percentage of a region width, for example.

Final threshold value SL may be set at a weighted average value of the average value AVWP obtained in the normal rotation or threshold value SL set based on the average value AVWP and the average value AVWP obtained in the reverse rotation or threshold value SL set based on the average value AVWP and a weight assigned to the value obtained in the normal rotation may be set at a greater value than a weight assigned to the value obtained in the reverse rotation in the weighted average arithmetic.

Moreover, the learning frequency in the reverse rotation is lower than that in the normal rotation and reliability of a learning result lowers over time from the learning. Therefore, the longer the time that has elapsed since the average value AVWP in the reverse rotation was obtained when the condition for the reverse rotation was satisfied, the smaller weight may be assigned to the value obtained in the reverse rotation to thereby relatively increase the weight assigned to the value obtained in the normal rotation.

Although the rotation signals POS of different pulse widths WP are generated depending on the normal rotation and the reverse rotation as the rotation signals POS different between the normal rotation and the reverse rotation of crankshaft 120 in the embodiment, it is also possible that the pulse-like rotation signals POS may have different amplitudes depending on the normal rotation and the reverse rotation, for example.

For example, if the rotation signals POS are the pulse signals that are normally at the low level and shift to the high level for certain time periods at predetermined angle positions, height of the high level may be different between the normal rotation and the reverse rotation.

In this case, it is possible to obtain similar operation and effects to those in the embodiment by setting threshold values SL of the amplitudes based on the amplitudes of the rotation signals POS when the conditions for the normal rotation and/or the condition for the reverse rotation of crankshaft 120 are satisfied.

Moreover, the rotation signals POS may have pulse widths WP and amplitudes both of which are different depending on the normal rotation and the reverse rotation. A determination result of the normal rotation/reverse rotation may be output when a determination result of the normal rotation/reverse rotation based on pulse width WP and a determination result of the normal rotation/reverse rotation based on the amplitude agree with each other and a determination result that the rotating direction is unknown may be output when both the determination results do not agree with each other.

Although the rotation signals POS different depending on the normal rotation and the reverse rotation also function as the measurement signals of the rotating position of crankshaft 120 in the above embodiment, it is also possible to individually generate the rotation signals for detecting the normal rotation/reverse rotation of crankshaft 120 and the measurement signals of the rotating position of crankshaft 120.

However, if the rotation signals different depending on the normal rotation and the reverse rotation of crankshaft 120 also function as the measurement signals of the rotating position of crankshaft 120, the number of rotation detectors can be reduced and the signal processing circuit can be simplified.

Although it is diagnosed whether or not crank angle sensor 117 is abnormal condition based on comparison between threshold value SL and the maximum and minimum values in the embodiment, the abnormal condition can be diagnosed based on comparison between the average value AVWP and the allowable region in which the average value AVWP can vary or the abnormal condition can be diagnosed based on a deviation of the previous value and the present value of threshold value SL or the average value AVWP from each other.

The rotation detecting device for determining whether the condition for the normal rotation or the condition for the reverse rotation of the rotating shaft is satisfied and setting the threshold value based on the rotation signal when it is determined that the condition for the normal rotation or the condition for the reverse rotation is satisfied is not only applied to detection of rotation of the output shaft of the internal combustion engine but can be applied to detection of rotation of a rotating shaft that can rotate reversely. For example, the rotation detecting device and method according to the invention of the application can be applied to detection of rotation of a rotating shaft forming a power transmission device of the vehicle and rotating in different directions depending on forward or reverse traveling of the vehicle. The rotating shaft rotating in the different directions depending on the forward or reverse traveling of the vehicle is an output shaft of a transmission, for example.

Although crank angle sensor 117 is formed so that the rotation signals POS are lacked in the predetermined crank angle positions in the embodiment, it is possible to use a crank angle sensor that continually outputs the rotation signals POS by detecting a ring gear of internal combustion engine 101, for example.

The entire contents of Japanese Patent Application No. 2009-066483, filed Mar. 18, 2009 and Japanese Patent Application No. 2009-292797, filed Dec. 24, 2009 are incorporated herein by reference.

While only selected embodiments have been chosen to illustrate the present invention, it will be apparent to those skilled in the art from this disclosure that various change and modification can be made herein without departing from the scope of the invention as defined in the appended claims.

Furthermore, the foregoing descriptions of the embodiments according to the present invention are provided for illustration only, and not for the purpose of limiting the invention as defined by the appended claims and their equivalents.

What is claimed is:

1. A rotation detecting device for determining normal rotation and reverse rotation of a rotating shaft of a vehicle, comprising:
    an output unit for generating a rotation signal output in response to rotation of the rotating shaft of a vehicle, the rotation signal being different between the normal rotation and the reverse rotation of the rotating shaft;
    a first determination unit for determining whether the rotating shaft is rotated in one of the normal direction and the reverse direction based on an operating condition of the vehicle;
    a setting unit for setting a threshold value which determines whether the rotation signal indicates the normal rotation or the reverse rotation based on a determined rotating direction and the rotation signal;
    a second determination unit for determining the normal rotation and reverse rotation of the rotating shaft based on the rotation signal and the threshold value;
    wherein the rotating shaft is an output shaft of an internal combustion engine;
    wherein the first determination unit determines whether or not the output shaft is rotating normally based on at least one of engine rotating speed, a cylinder in which a piston is in a predetermined position, an engine load, a starting operating state, intake pressure, and battery voltage; and
    wherein the first determination unit determines that the output shaft is rotating normally when an updating order of the cylinder of which piston position is determined to be in the predetermined position is normal.

2. The rotation detecting device according to claim 1 further comprising:
    a detection unit for detecting a stop position of the internal combustion engine based on the normal rotation/reverse rotation of the output shaft determined by the second determination unit;
    a diagnostic unit for determining whether or not the threshold value set by the setting unit is abnormal; and
    an output control unit for invalidating the stop position detected by the detection unit when the diagnostic unit determines that the threshold value is abnormal.

3. The rotation detecting device according to claim 1, wherein the rotation signal is a pulse signal output at every unit rotation angle of the rotating shaft and has a pulse width different between the normal rotation and the reverse rotation of the rotating shaft, and the second determination unit measures the pulse width of the rotation signal and determines the normal rotation/reverse rotation of the rotating shaft based on whether or not the measured pulse width is greater than the threshold value.

4. A rotation detecting device for determining normal rotation and reverse rotation of a rotating shaft of a vehicle, comprising:

an output unit for generating a rotation signal output in response to rotation of the rotating shaft of a vehicle, the rotation signal being different between the normal rotation and the reverse rotation of the rotating shaft;

a first determination unit for determining whether the rotating shaft is rotated in one of the normal direction and the reverse direction based on an operating condition of the vehicle;

a setting unit for setting a threshold value which determines whether the rotation signal indicates the normal rotation or the reverse rotation based on a determined rotating direction and the rotation signal;

a second determination unit for determining the normal rotation and reverse rotation of the rotating shaft based on the rotation signal and the threshold value;

wherein the rotating shaft is an output shaft of an internal combustion engine;

wherein the first determination unit determines whether or not the output shaft is rotating normally based on at least one of engine rotating speed, a cylinder in which a piston is in a predetermined position, an engine load, a starting operating state, intake pressure, and battery voltage; and wherein the first determination unit determines that the output shaft is rotating normally when the engine load has increased.

5. The rotation detecting device according to claim 4, further comprising:

a detection unit for detecting a stop position of the internal combustion engine based on the normal rotation/reverse rotation of the output shaft determined by the second determination unit;

a diagnostic unit for determining whether or not the threshold value set by the setting unit is abnormal; and an output control unit for invalidating the stop position detected by the detection unit when the diagnostic unit determines that the threshold value is abnormal.

6. The rotation detecting device according to claim 4, wherein the rotation signal is a pulse signal output at every unit rotation angle of the rotating shaft and has a pulse width different between the normal rotation and the reverse rotation of the rotating shaft; and the second determination unit measures the pulse width of the rotation signal and determines the normal rotation/reverse rotation of the rotating shaft based on whether or not the measured pulse width is greater than the threshold value.

7. A rotation detecting device for determining normal rotation and reverse rotation of a rotating shaft of a vehicle, comprising:

an output unit for generating a rotation signal output in response to rotation of the rotating shaft of a vehicle, the rotation signal being different between the normal rotation and the reverse rotation of the rotating shaft;

a first determination unit for determining whether the rotating shaft is rotated in one of the normal direction and the reverse direction based on an operating condition of the vehicle;

a setting unit for setting a threshold value which determines whether the rotation signal indicates the normal rotation or the reverse rotation based on a determined rotating direction and the rotation signal;

a second determination unit for determining the normal rotation and reverse rotation of the rotating shaft based on the rotation signal and the threshold value;

wherein the rotating shaft is an output shaft of an internal combustion engine;

wherein the first determination unit determines whether or not the output shaft is rotating normally based on at least one of engine rotating speed, a cylinder in which a piston is in a predetermined position, an engine load, a starting operating state, intake pressure, and battery voltage; and wherein the first determination unit determines that the output shaft is rotating normally when it is in the starting operating state of the internal combustion engine.

8. The rotation detecting device according to claim 7, further comprising:

a detection unit for detecting a stop position of the internal combustion engine based on the normal rotation/reverse rotation of the output shaft determined by the second determination unit;

a diagnostic unit for determining whether or not the threshold value set by the setting unit is abnormal; and an output control unit for invalidating the stop position detected by the detection unit when the diagnostic unit determines that the threshold value is abnormal.

9. The rotation detecting device according to claim 7, wherein the rotation signal is a pulse signal output at every unit rotation angle of the rotating shaft and has a pulse width different between the normal rotation and the reverse rotation of the rotating shaft; and the second determination unit measures the pulse width of the rotation signal and determines the normal rotation/reverse rotation of the rotating shaft based on whether or not the measured pulse width is greater than the threshold value.

10. A rotation detecting device for determining normal rotation and reverse rotation of a rotating shaft of a vehicle, comprising:

an output unit for generating a rotation signal output in response to rotation of the rotating shaft of a vehicle, the rotation signal being different between the normal rotation and the reverse rotation of the rotating shaft;

a first determination unit for determining whether the rotating shaft is rotated in one of the normal direction and the reverse direction based on an operating condition of the vehicle;

a setting unit for setting a threshold value which determines whether the rotation signal indicates the normal rotation or the reverse rotation based on a determined rotating direction and the rotation signal;

a second determination unit for determining the normal rotation and reverse rotation of the rotating shaft based on the rotation signal and the threshold value;

wherein the rotating shaft is an output shaft of an internal combustion engine;

wherein the first determination unit determines whether or not the output shaft is rotating normally based on at least one of engine rotating speed, a cylinder in which a piston is in a predetermined position, a starting operating state, intake pressure, and battery voltage; and wherein the first determination unit determines that the output shaft is rotating normally when the intake pressure of the internal combustion engine has increased or reduced a predetermined value from atmospheric pressure.

11. The rotation detecting device according to claim 10, further comprising:
a detection unit for detecting a stop position of the internal combustion engine based on the normal rotation/reverse rotation of the output shaft determined by the second determination unit;
a diagnostic unit for determining whether or not the threshold value set by the setting unit is abnormal; and
an output control unit for invalidating the stop position detected by the detection unit when the diagnostic unit determines that the threshold value is abnormal.

12. The rotation detecting device according to claim 10, wherein the rotation signal is a pulse signal output at every unit rotation angle of the rotating shaft and has a pulse width different between the normal rotation and the reverse rotation of the rotating shaft; and
the second determination unit measures the pulse width of the rotation signal and determines the normal rotation/reverse rotation of the rotating shaft based on whether or not the measured pulse width is greater than the threshold value.

13. A rotation detecting device for determining normal rotation and reverse rotation of a rotating shaft of a vehicle, comprising:
an output unit for generating a rotation signal output in response to rotation of the rotating shaft of a vehicle, the rotation signal being different between the normal rotation and the reverse rotation of the rotating shaft;
a first determination unit for determining whether the rotating shaft is rotated in one of the normal direction and the reverse direction based on an operating condition of the vehicle;
a setting unit for setting a threshold value which determines whether the rotation signal indicates the normal rotation or the reverse rotation based on a determined rotating direction and the rotation signal;
a second determination unit for determining the normal rotation and reverse rotation of the rotating shaft based on the rotation signal and the threshold value;
wherein the rotating shaft is an output shaft of an internal combustion engine;
wherein the first determination unit determines whether or not the output shaft is rotating normally based on at least one of engine rotating speed, a cylinder in which a piston is in a predetermined position, an engine load, a starting operating state, intake pressure, and battery voltage; and
wherein the first determination unit determines that the output shaft is rotating normally when the voltage of a battery provided to the internal combustion engine has increased.

14. The rotation detecting device according to claim 13, further comprising:
a detection unit for detecting a stop position of the internal combustion engine based on the normal rotation/reverse rotation of the output shaft determined by the second determination unit;
a diagnostic unit for determining whether or not the threshold value set by the setting unit is abnormal; and
an output control unit for invalidating the stop position detected by the detection unit when the diagnostic unit determines that the threshold value is abnormal.

15. The rotation detecting device according to claim 13, wherein the rotation signal is a pulse signal output at every unit rotation angle of the rotating shaft and has a pulse width different between the normal rotation and the reverse rotation of the rotating shaft; and
the second determination unit measures the pulse width of the rotation signal and determines the normal rotation/reverse rotation of the rotating shaft based on whether or not the measured pulse width is greater than the threshold value.

16. A rotation detecting method for determining normal rotation and reverse rotation of a rotating shaft of a vehicle, comprising the steps of:
inputting a rotation signal output as the rotating shaft rotates, the rotation signal being different between the normal rotation and the reverse rotation of the rotating shaft of the vehicle;
determining whether the rotating shaft is rotated in one of a normal direction and a reverse direction based on an operating condition of the vehicle;
setting a threshold value which determines whether the rotation signal indicates the normal rotation or the reverse rotation based on a determined rotating direction and the rotation signal;
determining the normal rotation and the reverse rotation of the rotating shaft based on the rotation signal and the threshold value;
wherein the rotating shaft is an output shaft of an internal combustion engine, and
the step of determining whether the rotating shaft is rotated in one of the normal direction and the reverse direction, includes the following steps of:
detecting at least one of engine rotating speed, a cylinder in which a piston is in a predetermined position, an engine load, a starting operating state, intake pressure, and battery voltage as an operating condition of the internal combustion engine;
determining whether or not the output shaft is rotating normally based on the operating condition; and
wherein the step of detecting the operating condition detects the cylinder in which the piston is in the predetermined position; and
the step of determining whether or not the output shaft is rotating normally determines that the output shaft is rotating normally when an updating order of the cylinder of which piston position is determined to be in the predetermined position is normal.

17. The rotation detecting method according to claim 16 further comprising the steps of:
detecting a stop position of the internal combustion engine based on the normal rotation and the reverse rotation of the output shaft;
determining whether or not the threshold value is abnormal; and
invalidating the stop position when it is determined that the threshold value is abnormal.

* * * * *